Patented June 2, 1953

2,640,783

UNITED STATES PATENT OFFICE 2,640,783

INK HAVING IMPROVED DRYING PROPERTIES

Albert Charles Zettlemoyer, Bethlehem, Pa., and Isidor Mayer Bernstein, Brooklyn, N. Y., assignors to National Printing Ink Research Institute, Bethlehem, Pa., a nonprofit organization No Drawing. Application February 2, 1950, Serial No. 142,094

5 Claims. (Cl. 106—28)

This invention relates to inks with improved drying characteristics.

Objects and advantages of the invention will be set forth in part hereinafter and in part will be obvious herefrom, so may be learned by practice with the invention, the same being realized and attained by means of the instrumentalities and combinations pointed out in the appended claims.

The invention consists in the novel parts, constructions, arrangements, combinations and improvements herein shown and described.

A serious problem in the printing ink industry is the loss of drier effectiveness in some inks as they age. This phenomenon is particularly troublesome with inks containing lake pigments.

An object of this invention is to provide a solution to this problem by incorporating into the composition of the ink a substance which will prevent such loss of drier effectiveness upon aging of the ink.

We have found that, when cobalt borate, an insoluble cobalt salt, has been specially prepared and is incorporated into inks which normally exhibit severe loss of drier effectiveness upon aging, such loss of drier effectiveness is greatly reduced. This effect is even more pronounced when a small amount of cobalt linoleate is also added. The cobalt borate is incorporated into the ink most advantageously when it is prepared by adding a small amount, such as 0.5 part by weight, of Aerosol OT to an aqueous borax solution prior to reacting said solution with a soluble cobalt salt, such as cobaltous nitrate. Aerosol OT is the trade-mark used by American Cyanamid & Chemical Corporation for the compound dioctylsodium sulfosuccinate.

It was discovered that the addition of a small amount, such as 0.5 part by weight, of Aerosol OT to the aqueous borax solution previous to the precipitation of the heavy metal borates from it resulted not only in a smaller particle size but, more important, rendered it in such a condition as to be preferentially wetted by an oil vehicle. The mechanism by which this takes place may be in part due to the adsorption of the Aerosol OT onto the particles of the heavy metal borates as they are formed. On mixing the water wetted filter cake of a heavy metal borate so prepared with an oil vehicle such as a heat-polymerized linseed oil vehicle immediate and substantial displacement of the water occurs, and it is then necessary only to pass the mix a few times over a three roller mill to obtain a smooth oil dispersion of the heavy metal borates of exceedingly fine particle size.

The following is a specific example of the preparation of cobalt borate and the subsequent "flushing" operation.

Preparation of cobalt borate 100 parts by weight of borax $Na_2B_4O_7.10H_2O$ in the form of a 0.1 molar aqueous solution to which 0.5 part by weight of Aerosol OT has been added, and 76.30 parts by weight by cobaltous nitrate $Co(NO_3)_2.6H_2O$ also in the form of a 0.1 aqueous molar solution are reacted at room temperature in a Y tube. The solutions come in contact at the junction of the Y at which point the precipitation of the cobalt borate takes place. The precipitate is filtered off and retained in the pulp state for the subsequent "flushing" operation. Yield is 52 parts by weight of cobalt borate on a dry basis.

"Flushing" of cobalt borate pulp 3 parts by weight of a medium heat-polymerized linseed oil are added to 1 part by weight, on the dry basis, of cobalt borate pulp as prepared above and the mixture stirred. Within a minute or two preferential oil wetting takes place and the "flushed out" water is poured off. The oil-cobalt borate mix is then given three or four passes over a three roller mill which results in a free-flowing dispersion.

In preparing other examples by this method, all samples gave pastes with excellent particle dispersions after four passes through the mill; the grinds possessed good fluidity. Upon repeated passes, the cobalt pastes changed from an opaque pink to a transparent dark red. This was probably due to the removal of the last of the water. While pastes from repeated passes on the mill flowed more freely immediately after grinding, these pastes set up to a higher viscosity on aging. The pastes prepared with #3 varnish were a bit heavier than those prepared with the #1 varnish. Samples were retained of the grinds after the initial four passes as well as of the grinds after repeated passes.

Varnish and ink samples of various concentrations of metal driers were prepared from the borate pastes. Vehicles used were a #1 Transparent Varnish and Yellow Lake ink containing 66.5% pigment and ground in #1 Litho Varnish. This Yellow Lake pigment had previously been found to exhibit pronounced dried adsorption. Cobalt linoleate, 8.5% cobalt metal, from the Harshaw Chemical Company, was used as a control.

The driers were incorporated into the ink or varnish with a spatula on a glass plate until uniform mixes were obtained. The borate pastes which had only a few passes through the mill were found to be much easier to work into the ink because they were not as viscous as the ones which had been milled repeatedly.

All drying tests were made on a Gardner Drying Time Recorder at a temperature of 68°±2 F. and a relative humidity of 65%±5. A high relative humidity was used in order to study drying action under poor drying conditions. The ink films were spread on glass plates by means of a small cylinder with a piston to keep a constant pressure on the ink in the cylinder. A milled slot at the end of the cylinder allowed a film 0.001 inch thick to be spread. Ink was placed within the cylinder, the piston put in and the cylinder then drawn down the glass plate. In drawing down, a uniform rate had to be maintained or the film will contain waves. With inks of high viscosity the draw-down rate had to be slower or a thinner film will result.

Measurements on dried Yellow Lake films by means of a micrometer showed the films to be of uniform 0.001 inch in thickness. This uniformity is essential in comparative drying time tests. These measurements were uniform not only for various positions on the film, but also for various viscosity inks. The film and glass plate were measured at a certain spot with the micrometer; the film was then removed from this spot with a razor blade and the thickness of the plate measured. The difference gave the film thickness at that point.

Drying times were then determined by placing the glass plates containing the film on the recorder track in the constant temp.-constant humidity room, and placing the geared wheel into position. The recorder track moves at a constant rate of three centimeters per hour. Gear marks are made on the film by the wheel. These marks are measured in centimeters and the drying time calculated from this.

Three end points are observable in the final film pattern, but only the first was used because it is the most easily and reproducibly read. The characteristic appearance of these gear marks changes as the film dries, and three relatively sharp changes are normally found and can be used as end points for the evaluation of drying time. Only the first of these was used for most of this study because it is the most easily and reproducibly read. The distance in centimeters from the beginning of the gear marks to this first end point is divided by three to give in hours what is known as the drop time. This drop time is the time required for the film to thicken sufficiently so that drops will no longer fall from the gear teeth into the gear track. It was found that this is the sharpest and most accurate point to read. In some films, especially at high viscosity, this point is a bit difficult to determine because even before drying sets in the ink doesn't flow readily. By locking down the film at a grazing angle, with light striking the film at an angle of about 30 degrees, a bright strip is seen. The point at which this bright strip begins coincides with the drop method on films when the actual drop is present. Yellow Lake films were read in this manner.

It was found that a certain threshhold concentration of cobalt is necessary to prevent loss in drier effectiveness on aging even in the absence of pigment. A concentration of 0.045% cobalt leads to loss of drier effectiveness whereas concentrations above 0.08% cobalt do not. The top practical concentration is about 2.0% cobalt as metal.

Tests which have been made indicated that inks made from a nine day old paste dried more slowly at the beginning of a run than did those from a sixty-five day old paste. However, after inks made from these pastes were about ten days old, there was little difference in the drying rate. A twenty-two day old paste showed little difference from the sixty five day paste. This indicates that the drier paste should be aged several weeks to achieve uniform results.

To determine the effect of increasing the concentration of the borate drier the drop time of three different samples of a Yellow Lake ink was measured over a period of days. When an amount equivalent to 0.56% cobalt metal was used the drop time was about 8 hours after 10 days and rose to almost 11 hours after 70 days. When the cobalt metal concentration was raised to 0.84% the drop time was slightly over 6 hours after 10 days and only about 7 hours after 70 days. Tests made with the concentration of cobalt metal at 1.4% concentration lowered the drop time to 3 hours at 10 days and this was lowered to slightly over 2 hours after 55 days.

By the addition of a small amount of soluble drier to an ink containing borate drier it was anticipated that the initial rapid decrease in drying rate would be cut down to a gradual loss until the point was reached at which the ink borate containing the same amount of borate drier (but no soluble drier) maintained the drying rate. Instead, the addition not only decreased the rate of loss, but also lowered the leveling off point considerably. By adding 0.05% cobalt as linoleate to an ink with 0.84% cobalt metal as borate the leveling off point was decreased from 6.8 hours to 2.3 hours after 20 days. This procedure of combining the use of cobalt borate with a small amount of soluble cobalt drier appears to be of considerable technological significance; it appears to provide a practical way of utilizing the cobalt borate feeder drier to overcome drier effectiveness loss on aging.

The invention in its broader aspects is not limited to the specific embodiment shown and described but departures may be made therefrom within the scope of the accompanying claims without departing from the principles of the invention and without sacrificing its chief advantage.

What is claimed is:

1. An ink comprising a pigment, a drying oil, cobalt borate in a concentration of at least 0.08% by weight and in the form of a flushed precipitated pulp and cobalt linoleate.

2. The ink of claim 1 in which the concentration of cobalt linoleate at least 0.05%.

3. An ink comprising a lake pigment, a drying oil and cobalt borate in a concentration of at least 0.08% by weight and in the form of a flushed precipitated pulp.

4. An ink comprising a pigment, a drying oil, and cobalt borate in the form of a flushed precipitated pulp and in a concentration by weight between 0.08% and 2.0% cobalt as metal.

5. The ink of claim 4 which also contains cobalt linoleate.

ALBERT CHARLES ZETTLEMOYER.
ISIDOR MAYER BERNSTEIN.

References Cited in the file of this patent

UNITED STATES PATENTS

| Number | Name | Date |
|---|---|---|
| 2,268,022 | Drummond | Dec. 30, 1941 |
| 2,406,795 | Bernardi et al. | Sept. 3, 1946 |

OTHER REFERENCES

A Practical Treatise—Manufacture of Colors for Painting, Riffault et al. (1874), page 584.

Hadert: Paint Manufacture, March 1932, pages 56 and 57.

Printing & Litho Inks, Wolfe, 3rd ed., 1941, pages 194, 197 and 198.

Zettlemoyer et al.: "Ind. Eng. Chem." (July 1949) 41, 1501–4.